Nov. 1, 1955 J. E. HISE 2,722,256
QUARTERING MACHINE FOR POTATOES AND THE LIKE
Filed Nov. 15, 1948 5 Sheets-Sheet 1

INVENTOR.
James E. Hise
BY
ATTORNEY

Nov. 1, 1955 J. E. HISE 2,722,256
QUARTERING MACHINE FOR POTATOES AND THE LIKE
Filed Nov. 15, 1948 5 Sheets-Sheet 2
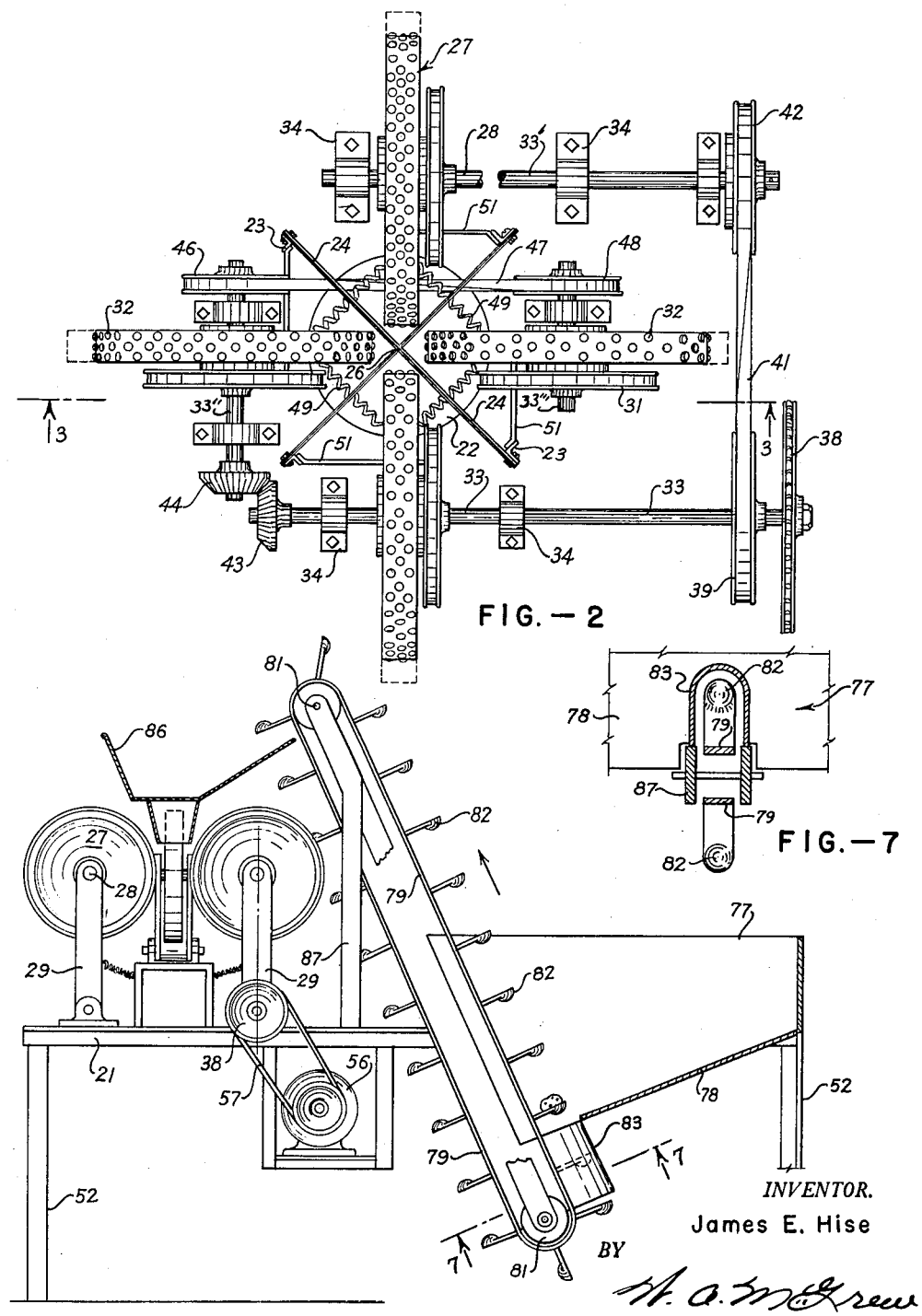
FIG.—2
FIG.—7
FIG.—6
INVENTOR.
James E. Hise
BY
ATTORNEY Nov. 1, 1955 J. E. HISE 2,722,256
QUARTERING MACHINE FOR POTATOES AND THE LIKE
Filed Nov. 15, 1948 5 Sheets-Sheet 3
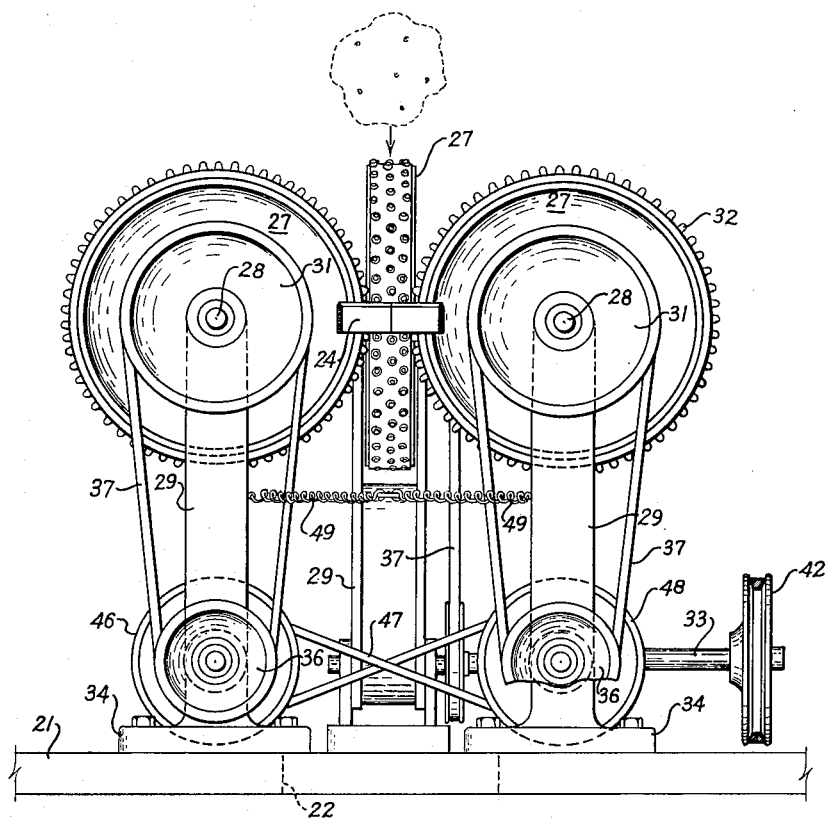
FIG.—3
INVENTOR.
James E. Hise
BY
ATTORNEY Nov. 1, 1955   J. E. HISE   2,722,256
QUARTERING MACHINE FOR POTATOES AND THE LIKE
Filed Nov. 15, 1948   5 Sheets-Sheet 4
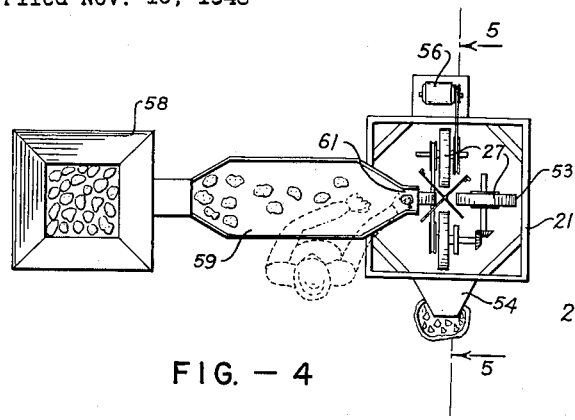
FIG. — 4
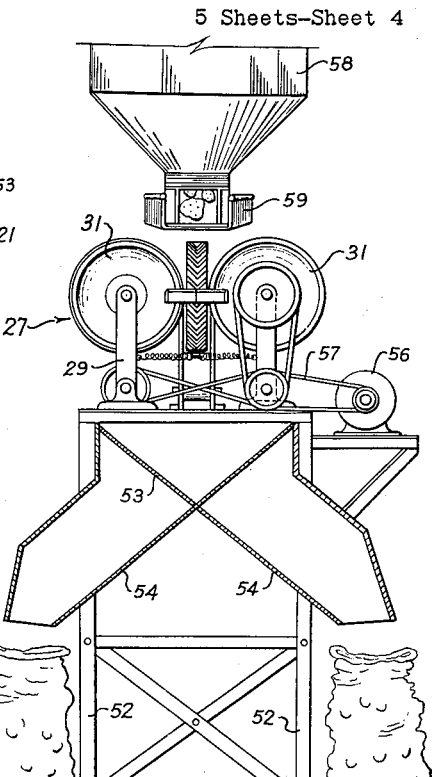
FIG. — 5
FIG. — 8
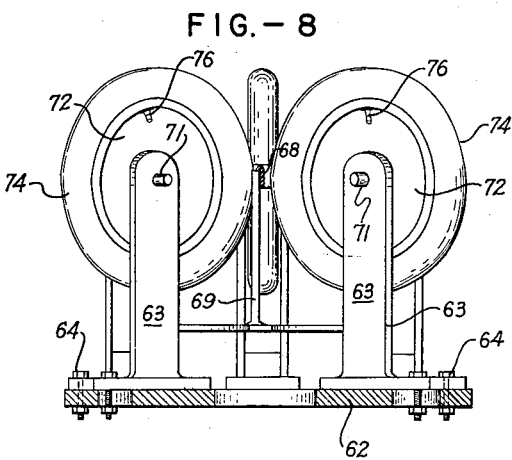
FIG. — 9
*INVENTOR.*
James E. Hise
BY
*ATTORNEY*

Nov. 1, 1955   J. E. HISE   2,722,256
QUARTERING MACHINE FOR POTATOES AND THE LIKE
Filed Nov. 15, 1948   5 Sheets-Sheet 5
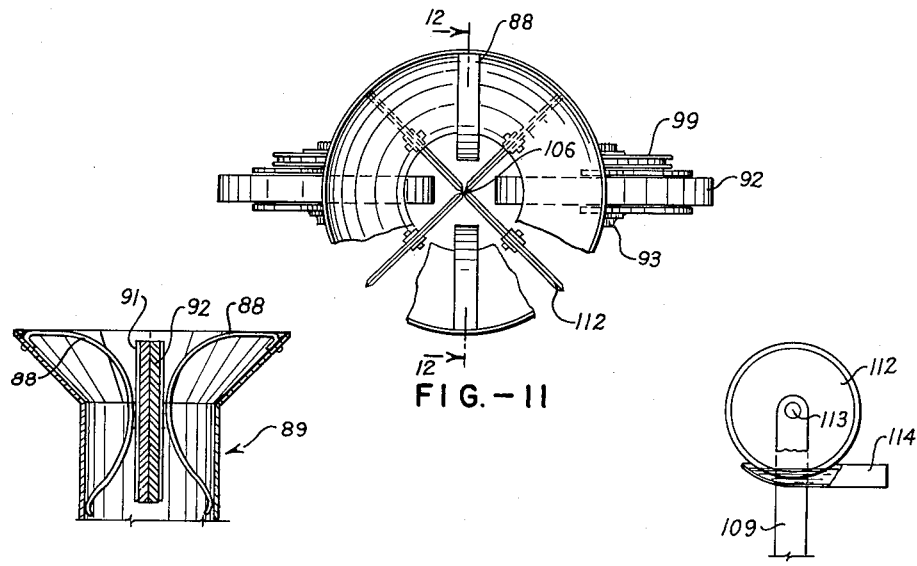
FIG.—11
FIG.—12
FIG.—13
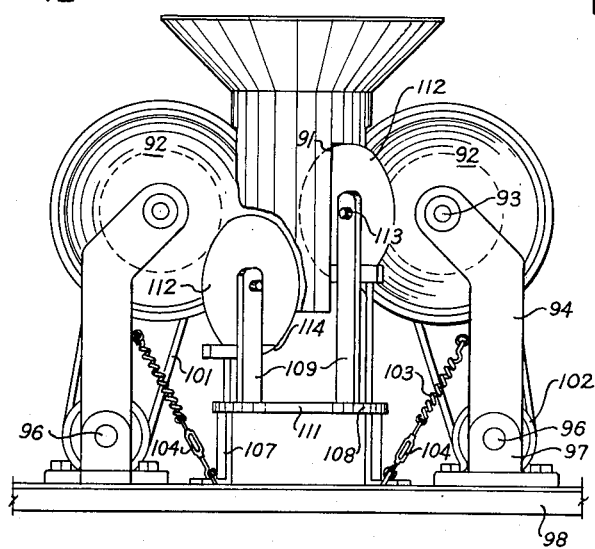
FIG.—10
INVENTOR.
James E. Hise
BY
ATTORNEY United States Patent Office 2,722,256
Patented Nov. 1, 1955

2,722,256

QUARTERING MACHINE FOR POTATOES AND THE LIKE

James E. Hise, Gering, Nebr.

Application November 15, 1948, Serial No. 60,113

1 Claim. (Cl. 146—164)

The present invention relates in general to a machine for dividing seed potatoes into equal segments and relates particularly to a power-driven machine wherein the seed potatoes are automatically centered and friction fed to segmenting knives.

Ordinarily, seed potatoes are carefully sized before sale; those below a predetermined size, such as say one inch in diameter, being planted without cutting.

Since the majority of seed potatoes are too large to plant without halving or quartering, migratory labor is employed to perform this operation by hand. This is unsatisfactory, since the cost is high, the supply of labor uncertain, and the accuracy of the work frequently so poor as to waste substantial quantities of valuable seed.

Several machines have been proposed for segmenting potatoes, but have in general been unsatisfactory because they fail to accurately center the seed potato, because of their low rate of production, their relatively high cost, and their liability to breakage by the accidental inclusion of foreign objects with the seed potatoes. Furthermore, certain of these machines have also impacted the potato to drive it through the knives, which is considered highly undesirable, since it results in bruising the potato.

An important object of the present invention is to provide a power-driven potato segmenting machine for seed potatoes or the like, in which the seed potatoes are automatically centered and friction fed without bruising through a segmenting device.

Another important object of the invention is the provision of a machine of the type described embodying means for disinfecting the knives employed in segmenting the potato and thus prevent contamination.

Other important objects of this invention include the provision of an apparatus of the type described wherein the operation is almost entirely automatic in nature, which will accurately segment the potatoes or the like without bruising and with a high order of accuracy, which may be inexpensively produced and which occupies but little space.

Other important objects, such as the provision of means for automatically feeding potatoes to our segmenting device, will become apparent in the course of the following detailed description and from the appended drawings in which:

Fig. 2 is a partial plan view of the device shown in Fig. 1;

Fig. 3 is a partial elevation taken along the line 3—3;

Fig. 4 is a diagrammatic plan view on reduced scale of the present invention, illustrating the arrangement of a feeding device;

Fig. 5 is an enlarged partially sectioned elevation of the invention taken along the lines 5—5 of Fig. 4;

Fig. 6 is a partially sectioned elevation of the invention incorporating an elevator;

Fig. 7 is an enlarged sectional view taken along the line 7—7 of Fig. 6;

Fig. 8 is a plan view of a modified form of the invention;

Fig. 9 is a partially sectioned elevation of the device shown in Fig. 8;

Fig. 10 is a partially broken away elevation of a power-driven potato segmenting machine constituting another embodiment of the invention;

Fig. 11 is a partially broken away plan view of the device shown in Fig. 10;

Fig. 12 is a vertical section taken along the lines 12—12 of Fig. 11; and

Fig. 13 is a partially sectioned elevation of one of the cutting disks shown in Fig. 10.

Figure 1:
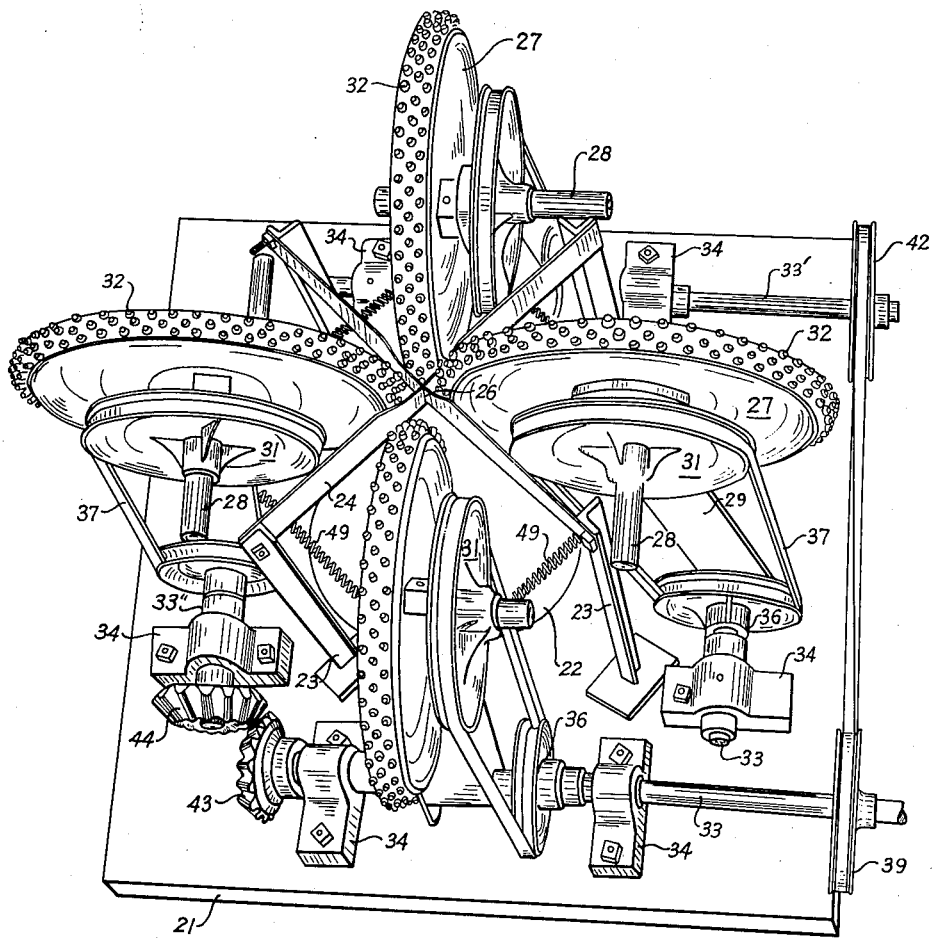
Fig. 1 is a perspective view of a potato segmenting machine incorporating the present invention.

In brief, my invention contemplates the use of a plurality of power-driven wheels driven at an equal speed and having equal diameters. Means are provided for resiliently urging the peripheries or surfaces of these wheels towards a common center line along which it is desired to divide the potato into segments. The actual cutting is done by knives disposed between or below these wheels, the plane of the knife or knives including the said center line. As the potato is fed into the space between the wheels, it is automatically centered by the wheels, which move resiliently towards and away from the center line, and is frictionally engaged by the wheels when properly centered. They move in and out away from the center line as the potato passes downwardly through the wheels and force the potato over the knives, which divide it into the desired number of segments. Means are provided for automatically feeding the potatoes to the machine and for conveniently delivering the segmented potatoes to the containers.

For a more detailed description, reference is made to Figs. 1–3 of the drawings in which the reference numeral 21 indicates a base of suitable dimensions having a centrally disposed opening 22 for the passage of segmented seed potatoes. For convenience of description and illustration, it may be assumed that the base 21 is square and supports posts 23—23 arranged upon diagonal imaginary lines extending between the corners of the base. A pair of knife blades 24 are secured at their ends to the posts 23 and intersect at a predetermined center line indicated at 26. If desired, the central portions of the blades 24 may be ground slightly concave at or near their line of intersection. Two pairs of wheels 27 are utilized in this modification of the invention for frictionally engaging the seed potatoes and driving them downwardly over the knives 24. These wheels are disposed in the spaces defined by the knives 24, the wheels of each pair being disposed in aligned relationship in such manner that the plane of each pair is at right angles to the plane of the other pair, and that said planes are at forty-five degrees to the planes of the crossed quartering knives 24. The wheels 27 are each keyed to individual shafts 28 rotatably mounted in arms 29 and support pulleys 31, fixed to the shafts 28 by keys or the like, it being understood that the wheels 27 are identical in size, as are the pulleys 31.

I prefer to provide a resilient high friction surface on each of the wheels such as rubber having a hardness of approximately thirty to fifty durometer A and provided with a plurality of closely spaced hobnail-like protuberances. This type of surface will readily engage the skin of a seed potato with sufficient strength to drive it over the knives 24, but will not bruise or injure the skin so that rot or other diseases may form. Each of the four arms 29 are journaled to separate drive shafts 33, 33', 33'', 33''', said shafts each being journaled in suitable pillow blocks 34, which are in turn secured to the base 21. Drive pulleys 36 are secured to the shafts 33 near the arms 29 and serve to drive belts 37, which extend over the pulleys 36 and 31. The shafts 33 are provided with a sprocket wheel 38 which may be driven by a chain from a suitable motor. Mounted near the sprocket is pulley 39 over which twisted belt 41 is run to engage a corresponding pulley 42 secured to the shaft 33, which is parallel to the shaft 33. Shaft 33 is also provided with a bevel gear 43 meshing with a bevel gear 44 secured to shaft 33'', extending laterally from shaft 33 and bearing a pulley 46 connected by a twisted belt 47 to a pulley 48 mounted on a parallel shaft 33'''. Thus it will be seen that means are provided for driving all four of the wheels 27 at an equal speed, and that since the arms 29 are free to rock about the shafts 33, the wheels 27 may move inwardly and outwardly away from the center line 26. Other means for driving the wheels at equal speed may be utilized.

To properly center a seed potato between the wheels 27, it is necessary to provide means for urging all of these wheels inwardly towards the center line 26 with approximately the same force. I therefore provide springs 49 or the like extending diagonally between the arms 29 in such manner that each arm 29 is drawn inwardly by two springs and each arm is interconnected with every other arm. If desired, means may be provided for varying the tension of the springs 49. As best shown in Fig. 2, I also provide stop members 51 which may be fixed to the posts 23 or to the frame 21 as desired, and engage the arms 29 to limit the innermost position of the wheels 27.

It is believed that the mode of operation of the invention is apparent from the drawings. The potatoes may be fed by hand or dropped into the space defined by the peripheries of the four wheels 27 over the center line 26. The wheels 27 are all driven at a constant speed and in the same direction so that the potato will be frictionally engaged by the protuberances 32 and forced downwardly over the knives 24, which will quarter the potato. The wheels 27 automatically center the potato, since they are resiliently urged towards the center line 26 with equal force. In practice, it will be found that the potato will be turned or bounced by the wheels until it is centered, at which time the wheels engage the potato and move outwardly the distance necessary to bring the center of the potato over the center line 26. The segmented potatoes fall downwardly after being cut through the opening 22 for delivery to a suitable container.

It is, of course, obvious that the potatoes may be halved as well as quartered by eliminating one of the knives 24. Foreign bodies introduced into the machine will not cause damage and are quickly detected, substantially their only effect being to occasionally dull the knives 24.

As shown in Figs. 4 and 5, the machine may be mounted on suitable legs 52 disposed at or near the corners of the base 21. The leaf type deflector 53 may be pivotally mounted below the opening 22 to deflect the quartered potatoes into either of two diverging chutes 54, below the discharge ends of which sacks or other suitable containers may be placed. A motor 56 driving a chain 57 which engages sprockets 38 may be mounted on legs 52 or in any other convenient position. A hopper 58 of suitable design may discharge on to a gently inclined table 59, the slope of which is insufficient to cause rolling of the potatoes by gravity, and which inter-connects the hopper 58 with the machine. Preferably, the discharge end 61 of the table 59 is constricted to permit the passage of only a single potato, which is rolled along by an operator stationed at the table. This particular method of feeding potatoes to the machine has proven effective in practice, since the operator may discard damaged or diseased potatoes and may also control the rate at which the potatoes are fed to the machine, thus avoiding crowding or possible jamming of the device.

As indicated, it is not essential that the wheels employed to frictionally engage the potatoes be resiliently urged inwardly by springs, or that the wheels be mounted on pivoted arms. I have illustrated in Fig. 8 a modification of the invention having a base 62 upon which three equally spaced wheel support yokes 63 are mounted as by bolts 64 engaging slots in the base 62. An opening 66 is formed in the base 62 on a center line indicated at 67 and directly below the point of intersection of three equally spaced knives 68 supported on posts 69. Shafts 71 extend through the yokes 63 and are connected to wheels 72 and to pulleys 73 by means of which the wheels 72 are driven at equal speeds. Mounted on the wheels 72 are inflated rubber tubes 74, or the like, which may have indentations formed on their periphery for increasing the frictional grip of the tubes with the potato. Valves 76 are provided for inflating the tubes 74 with air of relatively low pressure.

In operation, the peripheries of the tubes 74 are disposed within the spaces defined by the knives 68 equidistant from the center line 67, the bolts 64 being employed to retain the wheels 72 and the yokes 63 in the desired position. The pressure of air within the tube 74 is carefully calibrated to insure equal pressure in all the tubes 74. As the potato is fed to the space between the wheels 72, it will be engaged by the surfaces of the tubes 74, which are sufficiently resilient to yield in a manner similar to the springs 49 illustrated in Fig. 1, thus centering the potato over the center line 67 and driving it downwardly, whereupon the knives 68 cut the potato into three equal segments.

It will, of course, be understood that any suitable feeding arrangement may be employed to deliver potatoes to the segmenting device, it being necessary only to insure that the rate of delivery is balanced with the speed of the machine. A suitable automatic device for accomplishing this is illustrated in Figs. 6 and 7 and includes a hopper 77 having an inclined bottom 78. A belt or chain 79 is led over spaced pulleys 81 and provided with a plurality of spaced members 82, resembling spoons in shape, adapted to transport a single potato. The upwardly moving flight of the belt 79 passes through the hopper 77 and through a depending open sleeve 83, the length of which exceeds the distance between the members 82, and which is open at its upper end to a discharge opening 84 in the hopper 77. Since the sleeve 83 exceeds in length the distance between the members 82, it may be seen that potatoes can not pass downwardly through the sleeve 83 from the hopper; and since the members 82 can receive and retain only a single potato, it may be seen that potatoes will be fed at a constant rate to a suitable chute 86, which in turn feeds the potatoes to the segmenting device. When employed, the elevators should be supported by a member 87 secured at its lower end to either the base 21 or the legs 52, and should be driven from a variable speed mechanism.

Fig. 10 illustrates a modification of my device which is basically similar to the form illustrated in Figs. 1–3, but in which leaf springs 88 are substituted for one pair of the wheels 27. As illustrated in Figs. 10–12, inclusive I provide a hopper 89 having opposed slots 91 through which wheels 92 similar to wheels 27 project. The springs 88 are secured at one end to the hopper 89 and curve inwardly, being spaced apart a distance substantially equal to the minimum distance between the peripheries of the wheels 92. The wheels 92 may be keyed to suitable shafts 93 journaled in arms 94 which are in turn pivoted to shafts 96, rotatably supported by bearings 97 mounted on a base 98. Wheels 92 may be driven by pulleys 99 keyed to the shafts 93 and engaging belts 101 which extend over pulleys 102 keyed to shafts 96. Suitable means, not shown, may be employed for driving the shafts 96 at equal speeds. Tension springs 103 may extend from the arm 94 to a turnbuckle 104 or other tension adjusting device, which may in turn be secured to the base 98, thus providing means for resiliently urging the arms 94 and the wheels 92 inwardly with a force substantially equal to the force of the springs 88 towards a center line indicated at 106. Legs 107 support a platform 108 upon which are mounted four equally spaced posts 109, each of the opposed posts being of substantially equal length. An opening 111 is formed in the platform 108 for the passage of quartered potatoes. Cutting disks 112 are rotatably mounted on stub shafts 113 secured to the posts 109, and have sufficient radius to intersect at the center line 106. Since one pair of opposed posts 109 is taller than the other pair, it may be seen that the disks 112 may be disposed in such manner as to intersect in the line 106 and to overlap sufficiently to insure complete severance of a potato passing downwardly through the disks. Containers 114 for formaldehyde or other suitable disinfectant may be supported by the posts 109 or by other suitable means to continuously wet the periphery of the disks 112 as they rotate, thus sterilizing the cutting edges and insuring against the transmission of the disease from one potato to another by the cutting members.

Operation of this modification of the invention is somewhat similar to that previously described in that the wheels 92 center the potato between them. As the potato is being centered, the springs 88 being of equal strength, also aid in centering the wheels, this action continuing as the wheels 92 drive the potato downwardly over the disks 112, thereby dividing the potato into four equal segments and allowing the segments to fall through the opening 111 into a suitable container. The friction of the potato on the disks 112 causes their rotation and continuous sterilization by the disinfectant in the containers 114. Obviously disks of the type described may be substituted for the knives described in connection with other modifications of the invention, and are preferable in instances where diseased potatoes are frequently encountered, particularly those contaminated with wilt or ring rot.

In practice, I have found that the form of device illustrated in Fig. 1 is usually the most versatile and may utilize wheels having a diameter of approximately ten inches and a width of about one inch. These may be driven from a suitable motor or engine at approximately 65–105 R. P. M. Seed potatoes are usually carefully sized and will ordinarily run from an inch and one-half or an inch and seven-eighths in diameter to a maximum of three inches, it being in the judgment of the operator the number of segments into which the potato should be divided. Under these conditions my machine will handle and process a bushel of potatoes in one to two minutes, which is substantially faster than even the most excellent operator can cut potatoes accurately by hand. It is of course obvious from the simplicity of my machine that the cost of production will be relatively low and the cost of operation and maintenance negligible, with the result that the cost of preparing the potatoes for seeding is drastically reduced.

In compliance with R. S. 4888, I have described in detail certain preferred embodiments of my invention, but it will be obvious to those skilled in the art that many changes may be made without departing from the spirit and scope of this invention. I do not therefore limit myself to the details herein described except insofar as defined in the appended claim.

I claim:

A power driven machine for segmenting potatoes and the like, comprising, in combination, a support base, four upright posts carried on said support base and disposed at the corners of a square, a knife blade supported on the upper ends of each diagonally opposed pair of posts whereby said blades form a stationary X, four drive shafts each of which is journaled in bearings secured to said base support with said shafts being symmetrically located and each shaft being parallel to one side of said square, an upwardly extending arm journaled on each of said shafts midway between the ends thereof, a stub shaft journaled in the upper end of each of said arms at approximately the same level as said knife blade and extending parallel to the drive shaft therebelow, a feeding wheel rotatably mounted on each of said stub shafts so as to provide two pairs of opposed feeding wheels, each pair of feed wheels lying in a common plane which bisects one pair of opposite sides of said square, said feed wheels having rubber tires carrying integrally projecting hobnail protuberances, equi-tension springs symmetrically interconnecting each of said upwardly extending arms to the arms adjacent thereto whereby said wheels are all inwardly biased toward each other with equal force, and pulley and belt means operatively interconnecting all of said drive shafts and said feed wheels in common driving relationship whereby all of said feed wheels are adapted to be driven at a common speed and in a common direction.

References Cited in the file of this patent

UNITED STATES PATENTS

| Number | Name | Date |
|---|---|---|
| 555,918 | Ayer | Mar. 10, 1896 |
| 606,291 | Mengel | June 28, 1898 |
| 1,064,531 | Ott | June 10, 1913 |
| 1,072,628 | Lipscomb | Sept. 9, 1913 |
| 1,183,514 | Alexander | May 16, 1916 |
| 1,388,574 | Kelling | Aug. 23, 1921 |
| 1,445,590 | Houck | Feb. 13, 1923 |
| 1,499,950 | Smith | July 1, 1924 |
| 1,688,263 | Bullard | Oct. 16, 1928 |
| 1,702,432 | Furbush | Feb. 19, 1929 |
| 2,335,594 | Kerr | Nov. 30, 1943 |
| 2,342,122 | Cook | Feb. 22, 1944 |
| 2,452,810 | Uglow | Nov. 2, 1948 |
| 2,455,072 | Lindley | Nov. 30, 1948 |
| 2,487,719 | Meyer | Nov. 8, 1949 |
| 2,503,069 | Reichart | Apr. 4, 1950 |